Dec. 11, 1956  T. W. PROSSER  2,773,388
PROTECTIVE HOUSING FOR INSTRUMENTS
Filed Aug. 18, 1952  2 Sheets-Sheet 1
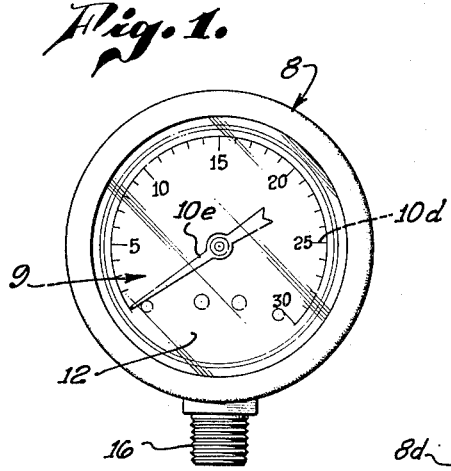
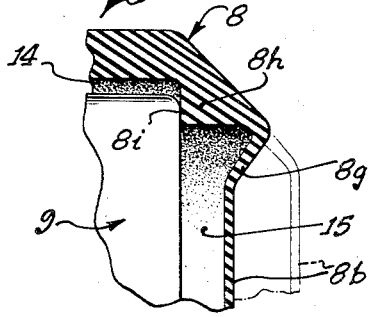
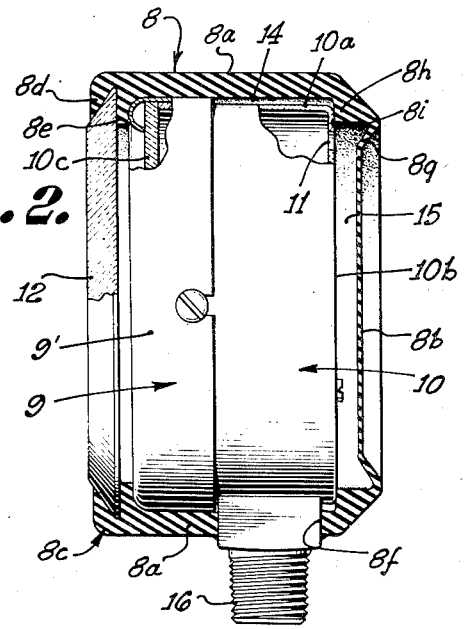
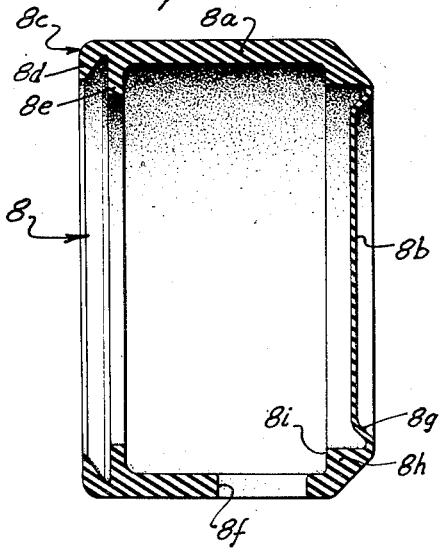
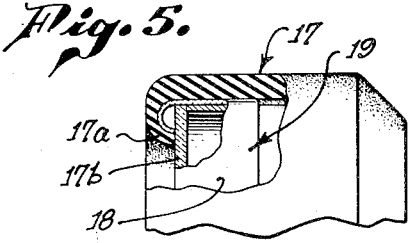
INVENTOR.
THOMAS W. PROSSER,
BY
Paul A. Weilein
ATTORNEY.

Dec. 11, 1956  T. W. PROSSER  2,773,388
PROTECTIVE HOUSING FOR INSTRUMENTS
Filed Aug. 18, 1952  2 Sheets-Sheet 2
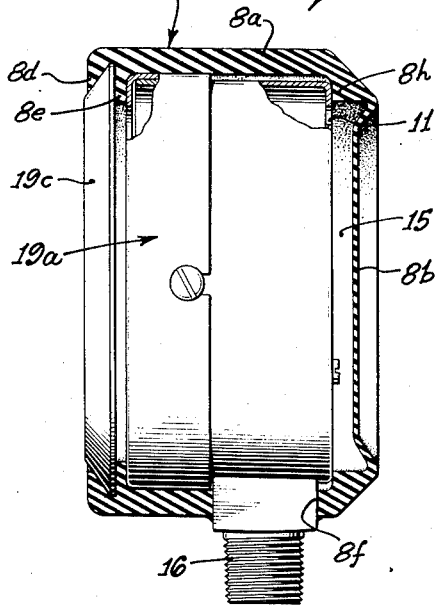
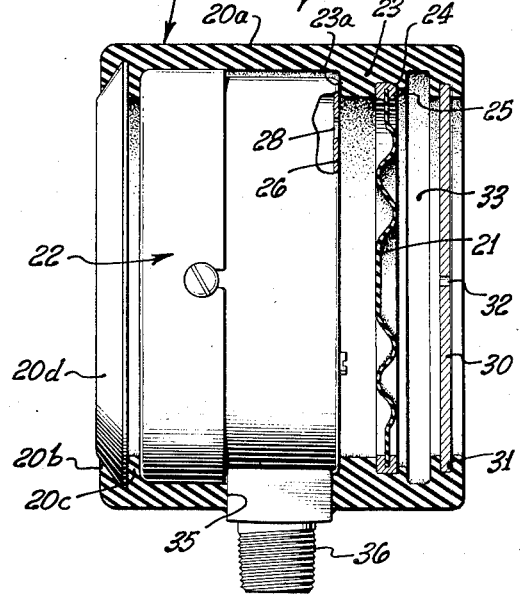
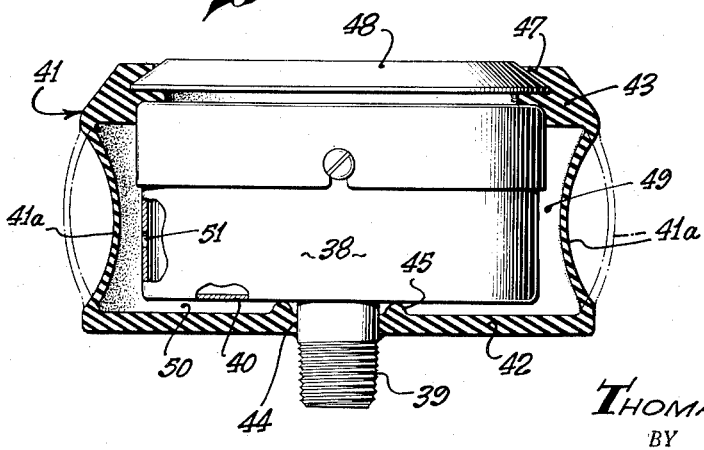
INVENTOR.
THOMAS W. PROSSER
BY
Paul A. Weilein
ATTORNEY.

United States Patent Office 2,773,388
Patented Dec. 11, 1956

2,773,388

PROTECTIVE HOUSING FOR INSTRUMENTS

Thomas W. Prosser, Riverside, Calif.

Application August 18, 1952, Serial No. 304,886

10 Claims. (Cl. 73—431)

This invention relates to protective means for preventing impairment and inaccurate operation of instruments which are deleteriously effected by exposure to the elements, chemical fumes and other foreign matter.

Accordingly, it is an object of this invention to provide a simple, readily applicable and efficient device, in the form of a cover or housing, which will seal an instrument to which it is applied, against the entrance into the interior thereof of dirt, dust, moisture, chemical fumes and other foreign matter and at the same time prevent interference with the operation of the gauge by pressures developed therein due to ambient temperatures.

It is another object of this invention to provide a protective instrument cover, such as described, which includes as a part thereof, a diaphragm operable to equalize the pressure interiorly of the instrument with that of the atmosphere.

It is another object of this invention to provide a protective and pressure-relieving cover such as described which may be made of synthetic rubber or similar material and readily applied for hermetically sealing a gauge or other instrument.

It is a further object of this invention to provide an instrument housing having a wall portion serving as a diaphragm, and a lip or rim portion adapted to form a seal with a transparent cover through which the instrument is read.

It is another object of this invention to provide an instrument housing which has the threefold function of protecting the instrument against corrosion, or other impairment, both exteriorly and interiorly, of protecting the instrument against being damaged when struck or dropped, and of relieving internal pressures tending to interfere with accurate operation thereof.

It is another object of this invention to provide a protective instrument housing such as described, which makes it possible to construct the instrument of less costly and more readily available materials.

It is a further object to provide a cover for the purpose described, which is applicable as an attachment to various types of instruments, wherein the instruments have provision for venting the interior thereof to the atmosphere.

It is another object of this invention to provide an instrument covering such as described, having a replaceable diaphragm as one wall thereof.

It is another object of this invention to provide an instrument cover or housing such as described, which forms a dead-air insulation space around portions of the case of the instrument to minimize pressure variation in the instrument due to variations of ambient temperatures to which the instrument is subjected.

It is another object of this invention to provide a protective housing which may be economically produced and will make possible an appreciable reduction in the cost of manufacture of various instruments of the type to which the housing may be applied, in that the cases of the instruments may be made of metal other than brass or other expensive non-corrosive material.

This invention possesses many other advantages and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 1 is a front elevation of an instrument having a protective cover embodying this invention;

Fig. 2 is a sectional view, on an enlarged scale, of the protective cover as applied to the instrument shown in Fig. 1;

Fig. 3 is a sectional view of the cover, removed from the instrument;

Fig. 4 is an enlarged fragmentary sectional view of the cover, showing how the diaphragm forms a portion of the cover and is movable relative thereto;

Fig. 5 is a view similar to Fig. 2, of a modified form of the cover;

Fig. 6 is a vertical sectional view of the cover shown in Fig. 2 as applied to a different form of instrument than shown in Fig. 2;

Fig. 7 is a cross sectional view of a modified form of this invention; and

Fig. 8 is a sectional view of another modified form of this invention.

One form of the present invention, as here shown, embodies a flexible cover or housing 8 for application to an instrument, for example the gauge 9 shown in Figs. 1 and 2, to hermetically seal the gauge and provide for relief of internal pressures which would interfere with accurate operation of the instrument. While the cover 8 is here shown as applied to a gauge of cylindrical form, it is to be understood that this invention contemplates the provision of protective covers of the character herein defined, for gauges and other instruments of various kinds, shapes and sizes.

The instrument 9, as here shown, comprises a case 10 formed of a continuous side wall 10a, a bottom or back wall 10b, and a transparent cover or lens 10c of glass or other suitable material through which the dial 10c and the pointer 10e are visible, the mechanism contained in the case for actuating the instrument being omitted.

As is customary, the case 10 is provided with a vent to the atmosphere to permit the instrument to "breathe" so that pressures will not be developed therein to an extent causing inaccurate operation of the instrument. In the present instance a vent 11 is provided in the back wall 10b. Heretofore, this vent or its equivalent, as provided in most instruments will permit dirt, moisture, chemical fumes and other foreign matter to enter the case and interfere with proper operation of, or cause damage to, the mechanism.

In accordance with the present invention, the cover 8 is designed to exclude dust, dirt, moisture, chemical fumes, and other foreign matter, from contact with the instrument case and from entering the interior of the case, as well as to relieve internal pressures which would impair or interfere with operation of the instrument.

Accordingly, the cover 8 is preferably made in one piece, of resilient, synthetic rubber or the like chemically inert material, and includes a continuous side wall 8a adapted to surround portions of the case 10, and a bottom or back wall 8b adapted to be spaced from the bottom or back wall 10b of the case. A rim or lip 8c is formed at the open end of the cup, to grip and hold a glass or other transparent lens element 12 in spaced relation to the glass lens 10c of the gauge proper, and so as to close the cover.

The lip 8c is formed with a pair of internal flanges 8d and 8e spaced from one another for gripping and sealing around the edge of the lens 12. The lens 12 has a beveled edge contacting a correspondingly bevelled face of the flange 8d and projecting somewhat outwardly beyond the outer surface of this flange, so that moisture will run off the lens 12 rather than collect thereon adjacent the flange.

It should be noted that the instrument 9, as here shown, has a flanged cap section 9' which forms a part of the case 10 and holds the glass 10c in place. This cap section increases the outside diameter of a part of the case 10, so that an insulation space 14 will be provided between that portion of the case 10 between the inner extremity of the cap 9' and the back or bottom wall 10b.

An opening 8f is provided in the side wall 8a of the cover 8 for accommodating the nipple 15 of the instrument 9, this opening being of smaller diameter than the nipple so that the cover will closely conform to the nipple.

In accordance with this invention, a part of the cover 8 is formed to serve as a diaphragm which will yield responsive to pressure variation internally of the instrument, as caused by variations in ambient temperatures to which the instrument is exposed. Thus, the back or bottom wall 8b of the cover serves as a diaphragm and is considerably thinner than the remainder of the cover.

The efficiency of the back wall 8b as a diaphragm, is increased by a bellows effect in its construction, wherein the marginal portion 8g of the wall 8b is formed so as to be inclined inwardly from an enlarged marginal portion 8h of the side wall 8a, toward the bottom or back wall 10b, thereby inwardly offsetting the major portion of the diaphragm-wall 8b. With this arrangement the indented or inwardly offset diaphragm-wall 8b is protected against damage and has a greater capacity for bellowing outwardly or inwardly as will be apparent with reference to Fig. 4.

The case 10 is confined between a shoulder 8i on the enlargement 8h and the flange 8e, so that the diaphragm is spaced outwardly from the wall 10b of the case 10, thereby forming a space 15 between the diaphragm and said wall. In this connection, it should be noted that the flanges 8d and 8e and the enlargement 8h serve as effective cushioning elements to protect the instrument as well as the diaphragm from being damaged when dropped or struck by other objects.

It should be noted that the dead air spaces 14 and 15 between the cover 8 and the case 10, as well as the dead air space between the lenses 12 and 10c, provide effective insulation, minimizing pressure variation in the gauge caused by variations of ambient temperature to which the instrument is subjected.

To insure an effective seal, suitable cement may be applied where the cover 8 embraces the nipple 16, also where the flange 8d contacts the glass 12.

It will now be apparent that the cover 8 as here provided, readily may be fitted over the instrument 9 to serve the functions of, hermetically sealing the instrument to prevent dirt, dust, moisture and other foreign matter from entering the interior thereof; of holding the glass 12 in place; of insulating the instrument to minimize pressure variation therein, of relieving pressures which would impair or cause inaccurate operation of the mechanism of the instrument, and of cushioning and protecting the instrument, as well as the diaphragm, against damage.

A modified form of this invention as shown in Fig. 5, comprises a resilient cover or housing 17 identical as to construction with the housing 8, except that it is provided with a rolled, inwardly directed lip portion 17a instead of the flanges 8d and 8e. The lip portion 17a forms a seal with a glass lens 17b held in place by the case 18 of an instrument 19 corresponding to the instrument 9.

In this form of the invention the cover 17 and the lens 17b form a housing for hermetically sealing the instrument 19, there being no lens on the case 18 other than the lens 17b.

Fig. 6 shows the cover or housing 8 as applied to an instrument 19a identical with the instrument 19 shown in Fig. 5. In this instrument, as in the instrument 19, the case is closed by a single glass lens 19c, the lens being held in place by the flanges 8d and 8e.

Another modified form of the invention as shown in Fig. 7, embodies a cover 20 similar to the cover 8 but provided with a different form of diaphragm 21. The cover 20 includes a continuous side wall 20a, here shown of cylindrical form and made of synthetic rubber or similar material to fit around an instrument 22 in the same manner as the wall 8a of the cover 8. The wall 20a is also provided at its outer end with flanges 20b and 20c for holding a glass 20d in place in the same manner as shown in Fig. 2.

At a point spaced inwardly from the other end of the wall 20a, is an internal flange 23 having a groove 24 to receive the rim 25 of the diaphragm 21, thereby mounting the diaphragm in spaced relation to the rear or bottom wall 26 of the instrument 22. This instrument is provided with a vent 28 in the wall 26, whereby the diaphragm will be operable to relieve pressures tending to interfere with the operation of the instrument. The flexibility and resiliency of the cover 20 makes it possible readily to fit the diaphragm in the groove 24 in the flange or to remove it should replacement thereof become necessary.

As here shown, the diaphragm 21 may be formed of light corrugated or marcelled synthetic rubber, or other suitable material, and is stabilized and protected by the rim 25 pressed or otherwise secured thereon.

If desired, a metal or plastic closure plate 30 may be detachably held within the cover in spaced relation to the diaphragm, by means of a grooved internal flange 31. A vent 32 is provided in the plate to equalize the pressure in the space 33 between the plate 30 and the diaphragm, with that of the atmosphere. With this arrangement, the plate 30 protects the diaphragm and the diaphragm may be replaced by removing the plate 30, it being unnecessary to remove the cover from the instrument for effecting this replacement.

In this form of the invention, the cover 20 is provided with an opening 35 which accommodates the nipple 36 of the instrument in the same manner as the cover 8. The flange 23 provides a shoulder 23a whereby the instrument is held between the flange 20c and the shoulder 23a.

Another modified form of this invention, as shown in Fig. 8, is adapted for application to an instrument 38 similar to the instrument 9, but having its nipple 39 extending from the back or bottom wall 40 thereof. In this form, the resilient cover 41 is made in one piece, of synthetic rubber or the like as is the cover 8, but the continuous side wall 41a thereof is formed of thinner rubber either in whole or in part to serve as a diaphragm. This diaphragm wall 41a is formed so as to be bowed inwardly whereby it may be bellowed outwardly without appreciable stretching in relieving excessive pressures developed internally of the instrument. The bottom or back wall 42 of the cover and the lip portion 43 are considerably thicker than the diaphragm wall 41a. This provides for greater flexibility of the diaphragm and adequate support therefor to assure that pressure interiorly of the instrument will be equalized with atmospheric pressure.

The back wall 42 is provided with an opening 44 to accommodate the nipple 39 and may be cemented to the nipple to provide a tight seal. An annular rib 45 may be formed on the inner side of the wall 42 around the opening 44 to contact the wall 40 of the instrument so as to space the wall 42 therefrom.

The lip portion 43 of the cover joined to the diaphragm-wall 41a, is thicker than the remainder of the cover and provided with flanges 47 for holding a glass lens 48 in place in substantially the same manner as shown in Fig. 3.

It should be noted that the lip portion 43 and the rib 45 on the back wall 42 surrounding the nipple are the only parts of the cover which contact the case of the instrument. These parts, with the aid of the nipple 39, maintain the cover in the desired position. Thus the diaphragm-wall 41a is circumferentially spaced from the instrument and provides a space 49 which with the similar space 50 between the back wall 42 and the instrument case, effectively insulates the instrument. The interior of the instrument case is communicable with these spaces through a vent 51 in the side of the case.

This form of cover may be cemented around the nipple and the glass to assure a hermetic seal, whereby this form, as well as the other forms, may be submerged or exposed to the elements, chemical fumes, and other foreign matter, without causing damage thereto or inaccurate operation thereof.

It should be noted, that in all the forms of this invention the diaphragm element forms a part of the cover or housing which is applicable to various forms of instrument to protect them against damage and to prevent inaccurate operation thereof.

I claim:

1. A protective housing for the case of an instrument, comprising: a cover including a flexible resilient wall adapted to surround said case, a diaphram joined to said wall and closing one end of said cover, means on said cover for spacing said diaphragm from said case, and means on said wall at the other end of said cover for maintaining an element in position closing and sealing the other end of said cover.

2. A protective housing for an instrument, comprising: a flexible, resilient cover including a wall adapted to surround the case of the instrument, a diaphragm, means interiorly of said wall removably mounting said diaphragm in inwardly spaced relation to one end of said cover, and means formed on said wall adapted to form a seal between the other end of said cover and said case.

3. A protective housing for an instrument, comprising: a flexible, resilient cover including a wall adapted to surround the case of the instrument, a diaphragm, means interiorly of said wall removably mounting said diaphragm in inwardly spaced relation to one end of said cover, and means formed on said wall adapted to form a seal between the other end of said cover and said case, and a closure mounted within said one end of the cover in spaced relation to said diaphragm.

4. In combination with an instrument having a case enclosing the operating mechanism thereof, said case having provision for communicating the interior thereof with the atmosphere, a cover including a wall adapted to surround said case, a transparent member through which the dial face of the instrument may be viewed, means on said wall forming a seal with said member, and a diaphragm joined to said wall and forming with said wall and said member an hermetically sealed enclosure for said case, wherein the diaphragm is responsive to fluid pressure within said case as well as to atmospheric pressure, said wall having a shoulder thereon contacting the back of said case and spacing said diaphragm from said back.

5. In combination with an instrument having a case enclosing the operating mechanism thereof, said case having provision for communicating with the interior thereof with the atmosphere, a flexible and resilient side wall adapted to surround said case, a flexible back wall joined with said side wall, one of said walls being of less thickness than the other wall to act as a diaphragm, a transparent member through which the instrument may be read, and means on said side wall sealing with said transparent member, said walls and said transparent member forming an hermetically sealed enclosure around said case, and means spacing said diaphragm wall from said case.

6. In combination with an instrument having a case enclosing the operating mechanism thereof, said case having provision for communicating the interior thereof with the atmosphere, a flexible and resilient side wall adapted to surround said case, a flexible back wall joined with said side wall, one of said walls being of less thickness than the other wall to act as a diaphragm, a transparent member through which the instrument may be read, and means on said side wall sealing with said transparent member, said walls and said transparent member forming an hermetically sealed enclosure around said case, and means spacing said diaphragm wall from said case, including elements within said enclosure, respectively contacting the front and back of said case.

7. A protective device for enclosing the case of an instrument, comprising: a flexible resilient cover open at the top and having a side wall adapted to surround said instrument and a bottom wall integral with the side wall for embracing the case of said instrument; means on said side wall at the open top of said cover forming a seal with the case; a flexible diaphragm embodied in said bottom wall; and means maintaining said bottom wall in outwardly spaced relation to the portion of the case opposed thereto.

8. A protective device adapted to seal and prevent the entrance of dirt, moisture and other foreign matter into the interior of a vacuum gauge including a casing having a vent from the interior thereof to the atmosphere, comprising a cover portion including a wall portion adapted to envelop said gauge, a flexible resilient diaphragm portion thinner than the remainder of said cover portion which is in communication with said vent of said gauge, and a shoulder means connected to said wall portion spacing said diaphragm portion outwardly from the casing of said gauge and from the remaining cover portion of said device whereby variations in the internal pressure of said instrument are equalized against the atmosphere outside of said protective device through said vent and against said flexible resilient diaphragm portion.

9. A protective housing for enveloping the case of an instrument, comprising: a cover open at the top including a flexible resilient wall adapted to embrace said case, a flexible diaphragm joined to said wall and closing one end of said cover, means on said cover for spacing said diaphragm from said case, and a shoulder on said wall at the top of said cover for maintaining a sealing element in position closing and sealing the top of said cover.

10. A protective device adapted to seal and prevent the entrance of dirt, moisture and other foreign matter into the interior of a vacuum gauge including a casing having a vent from the interior thereof to the atmosphere, comprising a cup-like casing adapted to envelop side and rear walls of said gauge, said casing including side wall portions thinner than the remainder of the casing, said side wall portions defining a resilient diaphragm in communication with said vent of said gauge and a shoulder connected to a rear wall portion of said casing spacing said diaphragm portion away from the casing of said gauge whereby variations in the internal pressure of said instrument are equalized against the atmosphere outside of said protective device through said vent and against said flexible resilient diaphragm portion.

References Cited in the file of this patent

UNITED STATES PATENTS

| | | |
|---|---|---|
| 2,182,830 | Wedder | Dec. 12, 1939 |
| 2,382,728 | Kupchick | Aug. 14, 1945 |
| 2,560,237 | Miller | July 10, 1951 |
| 2,607,228 | Coxon | Aug. 19, 1952 |